United States Patent
Parks

(10) Patent No.: US 12,287,897 B2
(45) Date of Patent: Apr. 29, 2025

(54) FIELD LEVEL ENCRYPTION SEARCHABLE DATABASE SYSTEM

(71) Applicant: Salesforce, Inc., San Francisco, CA (US)

(72) Inventor: Freeman Parks, Indianapolis, IN (US)

(73) Assignee: Salesforce, Inc., San Francisco, CA (US)

(*) Notice: Subject to any disclaimer, the term of this patent is extended or adjusted under 35 U.S.C. 154(b) by 607 days.

(21) Appl. No.: 17/325,405

(22) Filed: May 20, 2021

(65) Prior Publication Data

US 2022/0374540 A1  Nov. 24, 2022

(51) Int. Cl.
| | |
|---|---|
| G06F 21/62 | (2013.01) |
| G06F 16/22 | (2019.01) |
| G06F 16/28 | (2019.01) |
| G06F 21/60 | (2013.01) |
| G06F 21/10 | (2013.01) |

(52) U.S. Cl.
CPC ...... *G06F 21/6227* (2013.01); *G06F 16/2282* (2019.01); *G06F 16/288* (2019.01); *G06F 21/602* (2013.01); *G06F 21/107* (2023.08)

(58) Field of Classification Search
None
See application file for complete search history.

(56) References Cited

U.S. PATENT DOCUMENTS

| | | | | |
|---|---|---|---|---|
| 9,246,686 B1 * | 1/2016 | Holland | ................... | H04L 63/12 |
| 11,507,283 B1 * | 11/2022 | Olson | ................... | G06F 16/909 |
| 11,671,251 B1 * | 6/2023 | Copparapu | ........... | H04L 9/0618 |
| | | | | 380/44 |
| 2005/0223022 A1 * | 10/2005 | Weissman | ........... | G06F 16/2264 |
| | | | | 707/999.102 |
| 2007/0136279 A1 * | 6/2007 | Zhou | ................... | G06F 16/9566 |
| | | | | 707/E17.115 |
| 2012/0016999 A1 * | 1/2012 | Kieselbach | ........... | G06F 16/289 |
| | | | | 709/229 |
| 2017/0222804 A1 * | 8/2017 | Dewitt | ................... | H04L 9/0861 |
| 2018/0109378 A1 * | 4/2018 | Fu | ........................ | H04L 9/0897 |
| 2018/0337778 A1 * | 11/2018 | Scheiblauer | ........... | H04L 9/0866 |
| 2019/0121892 A1 * | 4/2019 | Beier | ................. | G06F 16/24547 |
| 2019/0149320 A1 * | 5/2019 | Keselman | ............. | G06F 16/248 |
| | | | | 380/279 |
| 2019/0236156 A1 * | 8/2019 | Fanghaenel | ......... | G06F 16/2246 |
| 2020/0045037 A1 | 2/2020 | Parks et al. | | |

FOREIGN PATENT DOCUMENTS

| | | | | | |
|---|---|---|---|---|---|
| WO | WO-0146826 A1 * | 6/2001 | | ......... | G06F 21/6254 |

* cited by examiner

*Primary Examiner* — Harunur Rashid
(74) *Attorney, Agent, or Firm* — Polygon IP, LLP

(57) ABSTRACT

A request to search a database field in a database table for a query value may be received. The query value may be hashed with a designated hash function and a designated hash key to produce a designated keyed-hash value. A row in the database table may be identified based on the designated keyed-hash value. The identified row may include a keyed-hash field value that matches the designated keyed-hash value. The identified row may include an encrypted field value generated by encrypting an unencrypted field value matching the query value. One or more data values associated with the identified row may be transmitted in response to the request.

12 Claims, 9 Drawing Sheets

FIELD LEVEL ENCRYPTION SEARCHABLE DATABASE SYSTEM

FIELD OF TECHNOLOGY

This patent document relates generally to database systems and more specifically to the storing of encrypted, searchable data in database systems.

BACKGROUND

The exposure of sensitive, personal information creates significant risk for both individuals and companies. Individuals who have personally identifying information exposed may be at risk of identity theft, phishing schemes, financial fraud, or even physical violence. For this reason, companies that store such information are legally and ethically obligated to safeguard it from inadvertent disclosure. Nevertheless, instances of information breaches have become common in recent years, highlighting the difficulty of implementing and maintaining robust information security practices.

Data encryption is an important aspect of information security, but data encryption in database systems poses significant challenges. Database systems are typically configured to facilitate rapid and efficient information search and retrieval. However, if data is stored in a database in an unencrypted but searchable state, then the data is at risk of exposure, for instance if an attacker gains access to the database system. Alternatively, data in a database system may be stored and maintained in an encrypted state. However, by virtue of being encrypted, ciphertext is not searchable in the same way as plaintext. Accordingly, maintaining strong encryption in a database system may eliminate some of the key advantages of database systems. Accordingly, improved techniques for information security in database systems are desired.

BRIEF DESCRIPTION OF THE DRAWINGS

The included drawings are for illustrative purposes and serve only to provide examples of possible structures and operations for the disclosed inventive systems, apparatus, methods and computer program products for a database system storing data in an encrypted, searchable state. These drawings in no way limit any changes in form and detail that may be made by one skilled in the art without departing from the spirit and scope of the disclosed implementations.

DETAILED DESCRIPTION

Figure 1:
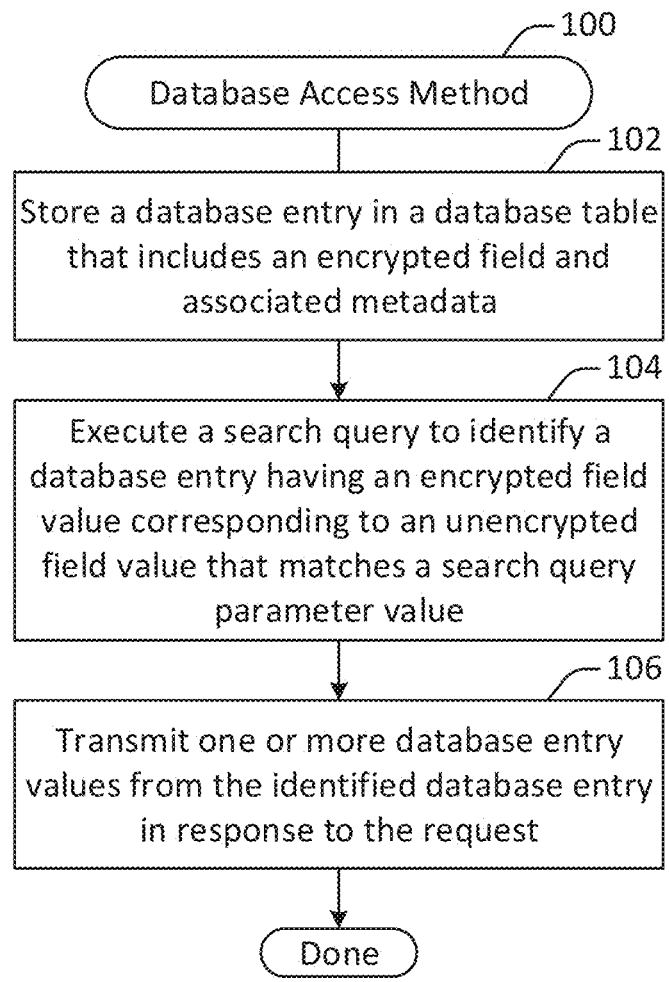
FIG. 1 illustrates an example of a method for accessing a database system, performed in accordance with one or more embodiments.

Techniques and mechanisms described herein provide for database systems in which database fields are stored in an encrypted state that is nevertheless searchable. When a request to store information in a database table is received, a field value associated with a database field designated for field-level encrypted may be encrypted using an encryption key. The encrypted value may then be stored instead of an unencrypted value. Along with the encrypted value, supporting metadata may also be stored, such as a keyed hash of the unencrypted value, one or more key identifiers, and other such information. The metadata may then be used to facilitate the execution of query requests to search the contents of the encrypted database field.

One conventional approach to database system security is to rely on the database system access control to prevent unauthorized access to data stored in the database system. However, such an approach includes only a single line of defense against unauthorized access. If an attacker gains access to the database, for instance by accidental leakage of database access credentials, then the attacker can access all of the data stored in the database system.

Another conventional approach to database system security is to encrypt the disk on which a database table is stored. However, in order to access the database table, the entire table then needs to be unencrypted, for instance when the database server is booted and initialized for the processing of database requests. Accordingly, although this conventional approach is more secure than storing the data in an unencrypted state, it still does not address the problem that the database access control provides the only protection against unauthorized data access.

Yet another conventional approach to database system security is to encrypt the entire database table. However, in such an approach, the unencrypted values remain accessible via a query function. Accordingly, although the data remains encrypted in such a configuration, such an approach still relies on the database system access control to prevent unauthorized access to data stored in the system.

Still another approach to database system security is to employ field level encryption where each data value in a database table field is encrypted using the same database key and initialization vector. Because the same database key and initialization vector is used to encrypt each value, the field may be searched by first encrypting a query string search parameter using the same key and initialization vector then comparing the encrypted values stored in the database system with the encrypted search parameter value. However, the encryption keys and initialization vector are typically stored in an external system rather than the database system, leaving the encryption and decryption logic to be handled by the middle tier rather than the data tier in the N-tier conceptualization of an application. Further, using the same key and initialization vector to encrypt all database values also creates a security weakness, described using the example in the following paragraph.

Consider, for instance, a hacker named Alexandra who seeks to access a database that stores user information for millions of users. Suppose that each entry corresponds with a user, and that one field in the database identifies the U.S. state in which the user lives. Now suppose further that each entry is encrypted with the same database key and initialization vector, and that Alexandra is able to gain access to the encrypted database values. Because each entry is encrypted with the same database key, a plaintext value such as "Indiana" would be encrypted to the same ciphertext value (e.g., A353fd342) in each row where the plaintext value appears. Alexandra would then be able to count the number of occurrences of each ciphertext value and use that information to aid in her efforts to decrypt the database. Such a configuration may leave the system open to any number of cryptanalysis attacks, such as cipher-only attacks, differential cryptanalysis attacks, chosen plaintext attacks, known-plaintext attacks, linear cryptanalysis attacks, and other tactics. For example, Alexandra might map the distribution of ciphertext values to the distribution of the population in the U.S. across states, thus providing insight about which plaintext values might map to particular states. As another example, Alexandra might analyze a set of ciphertext values where the plaintext values are known to her as part of an effort to identify the commonly used key and initialization vector.

In contrast to the conventional techniques, embodiments of techniques and mechanisms described herein provide for database systems in which data is encrypted both at rest and when the database system is active. According to various embodiments, different initialization vectors and potentially the same encryption key and may be used for different database entries, so that, for example, the plaintext value of "Indiana" is encrypted to one ciphertext value (e.g., A353fd342) in one row and a different ciphertext value (e.g., HJ3fdfzir4) in a different row. Because different database entries are encrypted with different initialization vectors, even if the attacker Alexandra were to gain access to the entire table of encrypted database values, she would not be able to execute many of the cryptanalysis attacks to which conventional techniques are vulnerable.

According to various embodiments, embodiments of techniques and mechanisms described herein may provide for enhanced database security. At the same time, a high level of database efficiency and speed may be maintained. That is, embodiments of techniques and mechanisms described herein may provide for a combination of performance and security unobtainable via conventional database techniques. Accordingly, embodiments of techniques and mechanisms described herein provide for significant functional improvements of the operation of database systems.

FIG. 1 illustrates an example of a method 100 for accessing a database system, performed in accordance with one or more embodiments. According to various embodiments, the method 100 may be performed on one or more computing devices within a computing services environment. Examples of systems and devices at which the method 100 may be performed are discussed with respect to FIG. 2, FIG. 6, FIG. 7, and FIG. 8.

A database entry is stored in a database table at 102. The database entry includes an encrypted field, an encryption key identifier, a keyed-hash value, a hash key identifier, an initialization vector, and one or more other fields. According to various embodiments, the database entry may be used to store any suitable data. For instance, the encrypted field may be an email address, residence address, phone number, or any other type of sensitive information.

In some implementations, the database system may be configured to employ symmetric encryption, where the same key is used to encrypt and decrypt the data. However, techniques and mechanisms described herein are broadly applicable to a variety of encryption schemes. For instance, in some configurations asymmetric encryption may be used instead.

According to various embodiments, the database system may be configured such that different rows in the database table employ different initialization vectors to encrypt the encrypted field. In this way, identical plaintext field values in different rows may be encrypted to different ciphertext field values. For instance, the name "Alexandra" may be encrypted to Value X in one row and Value Y in another row.

At 104, a search query is executed to identify a database entry that has an encrypted field value corresponding to an unencrypted field value that matches a search query parameter value. In some implementations, executing the search query may involve computing a keyed-hash value based on the search query parameter value and then searching for the keyed-hash value metadata stored in the database table.

One or more database entry values from the identified database entry are transmitted at 106 in response to the request. Techniques for storing a database entry that includes an encrypted field value are discussed in additional detail with respect to the method 400 shown in FIG. 4. Techniques for executing a search query to identify a database entry are discussed in additional detail with respect to the method 500 shown in FIG. 5.

Figure 2:
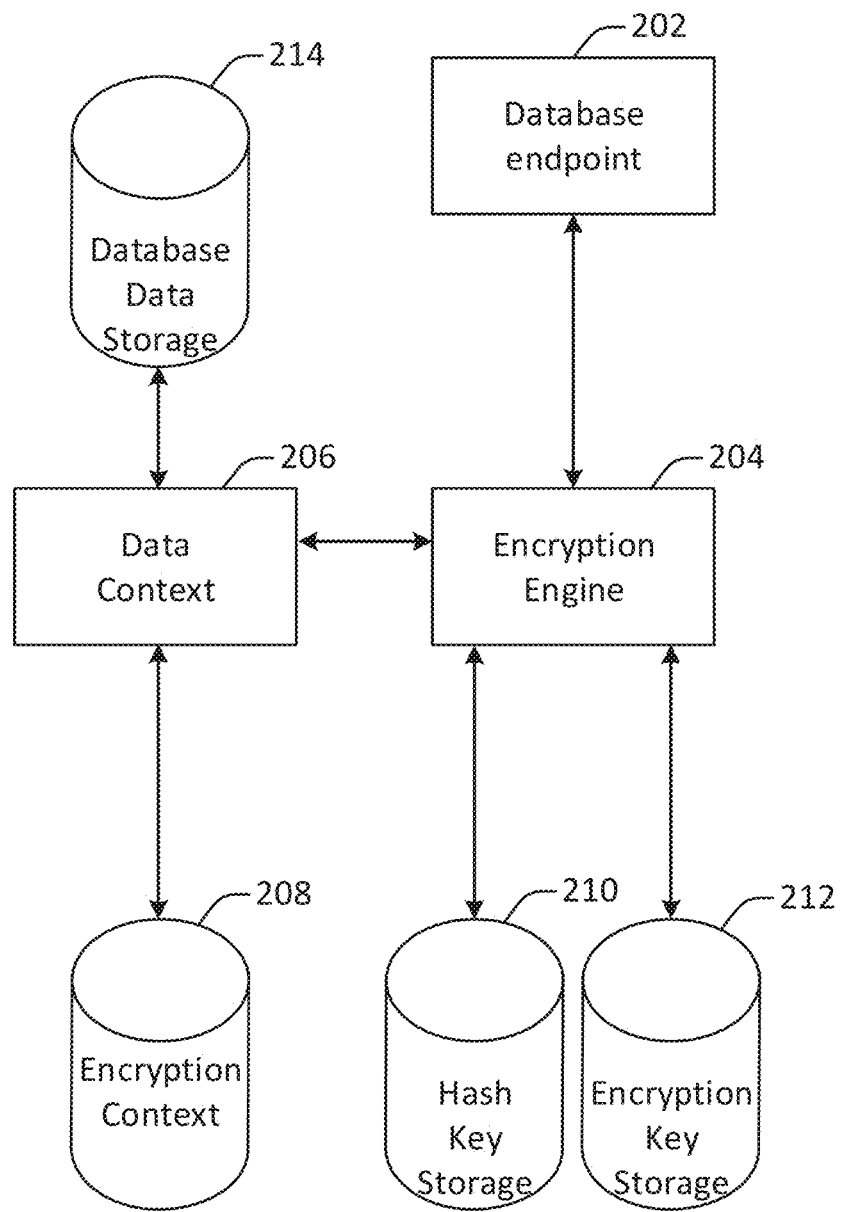
FIG. 2 illustrates an example of an arrangement of components in a database system, configured in accordance with one or more embodiments.

FIG. 2 illustrates an example of an arrangement of components in a database system 200, configured in accordance with one or more embodiments. According to various embodiments, the database system 200 may be configured to perform techniques and mechanisms described herein. For instance, the database system 200 may be configured to perform one or more operations shown in the methods 100, 400, and 500 shown in FIGS. 1, 4, and 5.

The database system 200 includes a database endpoint 202, an encryption engine 204, and database data storage 214. The encryption engine 204 is in communication with data context system 206, encryption context system 208, hash key storage 210, and encryption key storage 212.

According to various embodiments, the database data storage 214 may store information associated with one or more database tables. For instance, a database table may include fields such as a ciphertext field, other database fields, and other associated metadata. Additional details regarding the configuration of a database table are discussed with respect to the configuration 300 shown in FIG. 3.

According to various embodiments, the database endpoint 202 may be configured to facilitate access to the database system. For example, the database endpoint 202 may be configured to receive data to be stored in the database. The database endpoint 202 may then communicate with the database encryption engine 204, the database data storage 214, and/or one or more other components to store the data in the database system. Additional details regarding such operations are discussed throughout the application, and particularly with respect to the method 400 shown in FIG. 4.

As another example, the database endpoint 202 may be configured to process database query requests. The database endpoint 202 may then communicate with the database encryption engine 204, the database storage 214, and/or one or more other components to execute the query requests. Additional details regarding such operations are discussed throughout the application, and particularly with respect to the method 500 shown in FIG. 5.

In some implementations, the encryption engine 204 is configured to perform operations related to encrypting and decrypting data stored in the database storage 214. Keys for encrypting and decrypting data may be stored in the encryption key storage 212. Keys for hashing plaintext values may be stored in the hash key storage 210.

According to various embodiments, hash keys and encryption keys may be stored in any of a variety of different ways. For example, keys may be stored in a physical hardware security module, which may exhibit characteristics such as being tamper evident, tamper resistant, and/or tamper proof. As another example, keys may be stored in an encryption key manager implemented on a server within a computing services environment. As yet another example, keys may be stored in a database table within the database system. As still another example, keys may be stored in any other mechanism so long as they are secure and yet readily accessible for decryption and encryption.

In some embodiments, hash keys and encryption keys may be stored in different storage modules, as shown in FIG. 2. However, a variety of alternative configurations may be used. For example, some or all of the hash keys and encryption keys may be stored in the same module. As another example, some keys of a particular type may be stored in one type of storage (e.g., a hardware security module) while other keys of the same type may be stored in a different type of security module (e.g., a database table).

According to various embodiments, the data context module 206 stores metadata information regarding the storage of data in the database data storage 214. For example, the data context module 206 provides references to database tables stored in the database storage 214. Accordingly, the data context module 206 may be used to access information such as the types of values stored in particular database fields, the entity that owns the data in particular database rows, and identifiers for encryption context information. Each reference to a data table may also be used to access a corresponding encryption context entry.

In some implementations, the encryption context module 208 stores information used to encrypt and decrypt database fields. For instance, the encryption context module 208 stores information such as the type of encryption algorithm employed, the type of keyed hash algorithm employed, the particular database fields that are stored in an encrypted state, and other such data.

A database system may include potentially many components not shown in FIG. 2. However, particular components are shown in FIG. 2 for the purpose of illustration.

Figure 3:
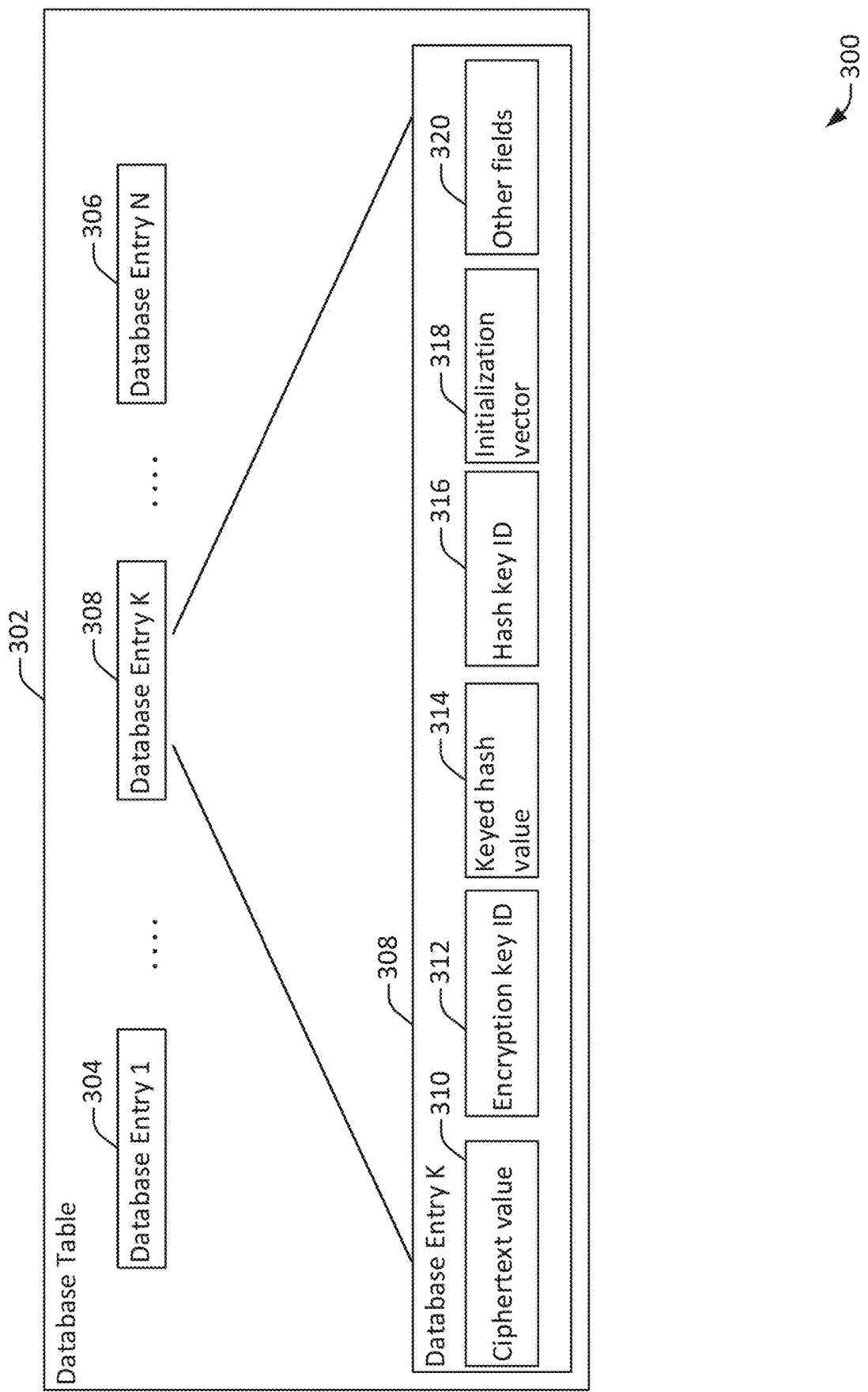
FIG. 3 illustrates an example of a configuration of a database system, configured in accordance with one or more embodiments.

FIG. 3 illustrates an example of a configuration 300 of a database system, configured in accordance with one or more embodiments. According to various embodiments, the configuration 300 may be used in conjunction with techniques described herein, such as the methods 100, 400, and 500 shown in FIGS. 1, 4, and 5.

The database configuration 300 includes the database table 302. The database table includes database entries 1 304 through N 306. A particular database entry K 308 is also shown. The database entry K 308 includes a ciphertext value 310, and encryption key identifier 312, a keyed-hash value 314, a hash key identifier 316, an initialization vector 318, and one or more other field values 320.

According to various embodiments, the initialization vector 318 stores a value used to generate the ciphertext value 310, in conjunction with the plaintext value and the encryption key 312. The initialization vector 318 may be a random, pseudorandom, or otherwise unpredictable value. For instance, the initialization vector 318 may be created at runtime by a random number generator, when the database entry K 308 is generated and/or updated.

According to various embodiments, any of various types of initialization vectors may be used. For instance, in a block cipher such as AES, the initialization vector 318 may be a value having the same length as the cipher's block size. Alternatively, the initialization vector 318 may be of a different length.

In some implementations, the initialization vector 318 may be used in any of various ways. For example, the encryption key may be used to encrypt the ciphertext value, and the initialization vector 318 may then be combined with the output (e.g., by an XOR operation). As another example, the initialization vector 318 may be used as the input for the cipher, with the output combined with the plaintext (e.g., by an XOR operation). The particular configuration employed may depend, for instance, on the type of encryption algorithm being used.

In some embodiments, instead of storing the initialization vector itself at 318, the initialization vector may be stored at a different location, such as with the hash keys and/or encryption keys. In such a configuration, an initialization vector identifier may be stored at 318 instead of the initialization vector itself.

In particular embodiments, the initialization vector 318 may have different security requirements than a cryptographic key. For instance, under some conditions the initialization vector 318 itself may not need to be secret.

In some embodiments, an encryption key, a hash key, and/or an initialization vector may be provided by an outside entity, such as an organization storing data in the database. Alternatively, one or more such values may be generated by the computing services provider. For instance, a database key may be generated upon table creation, while an initialization vector may be generated (e.g., randomly or pseudo-randomly) at runtime.

According to various embodiments, the ciphertext value 310 stores the encrypted plaintext value. The encryption key identifier 312 identifies the encryption key used to encrypt the ciphertext value, along with the initialization vector 318. However, the key itself may be stored in a different location, such as the encryption key storage 212 shown in FIG. 2.

According to various embodiments, the keyed-hash value 314 stores a hashed version of the plaintext value. The hashed version of the plaintext value may be, for instance, a keyed-hash message authentication code (HMAC), an encrypted message authentication code (EMAC or DMAC), a Keccak message authentication code (KMAC), or other output of a suitable keyed-hash function. The hash key identifier 316 identifies the hash key used to hash the plaintext value. However, the hash key itself may be stored in a different location, such as the hash key storage 210 shown in FIG. 2.

In some implementations, any or all of a variety of information may be stored in the other fields 320. For example, the other fields 320 may include one or more field values for database fields that are not stored in an encrypted state. Such information may include, for instance, data that is less sensitive than the data stored in an encrypted state. As another example, the other fields 320 may include one or more database keys used to index the database table 302. As yet another example, the other fields 320 may include one or more identification fields that facilitate the identification of the data context and/or the encryption context.

In particular embodiments, the database table 302 may be implemented as a multitenant table. In such a configuration, different entities (e.g., organizations) accessing computing services via an on-demand computing services environment may store data in the same database table. In such a configuration, the other fields 320 may store information such as an organization identifier that identifies the particular organization associated with a database entry.

In particular embodiments, different organizations may be associated with different data contexts and/or different encryption contexts. For example, one organization may specify that a particular field is to be stored in an encrypted state, while a different organization may specify that the same field is to be stored in an unencrypted state. As another example, different organizations may receive different levels of service, for instance based on a service plan. Different service plans may specify different encryption approaches. For instance, one service plan may specify that encryption keys are to be stored in a hardware security module, while another service plan may specify that encryption keys are to be stored in a database table.

In particular embodiments, the database table 302 may be a dynamic schema database table. In a dynamic schema database table, different database rows may be associated with different data object definitions. For example, one row may store a "user" object in which a particular field represents a mailing address associated with a user. However, a different row may store a "contact" object in which the same field stores a different type of value entirely, such as a phone number. In such a configuration, different database objects may be associated with different encryption contexts.

In particular embodiments, the database table 302 may be implemented both as a multitenant database table and as a dynamic schema database table. In such a configuration, different database rows may correspond to different database objects and/or be owned by different entities. Accordingly, the other fields 320 may store a variety of information, including but not limited to information identifying the object type and/or owning entity associated with the database row.

A database system may potentially include many database tables. However, for the purpose of illustration, only one row is shown in FIG. 3. Similarly, a database row may include potentially many different ciphertext values and corresponding encryption key identifiers, keyed-hash values, and/or hash key identifiers. However, for the purpose of illustration, only a single instance of each type of value is shown in FIG. 3.

Figure 4:
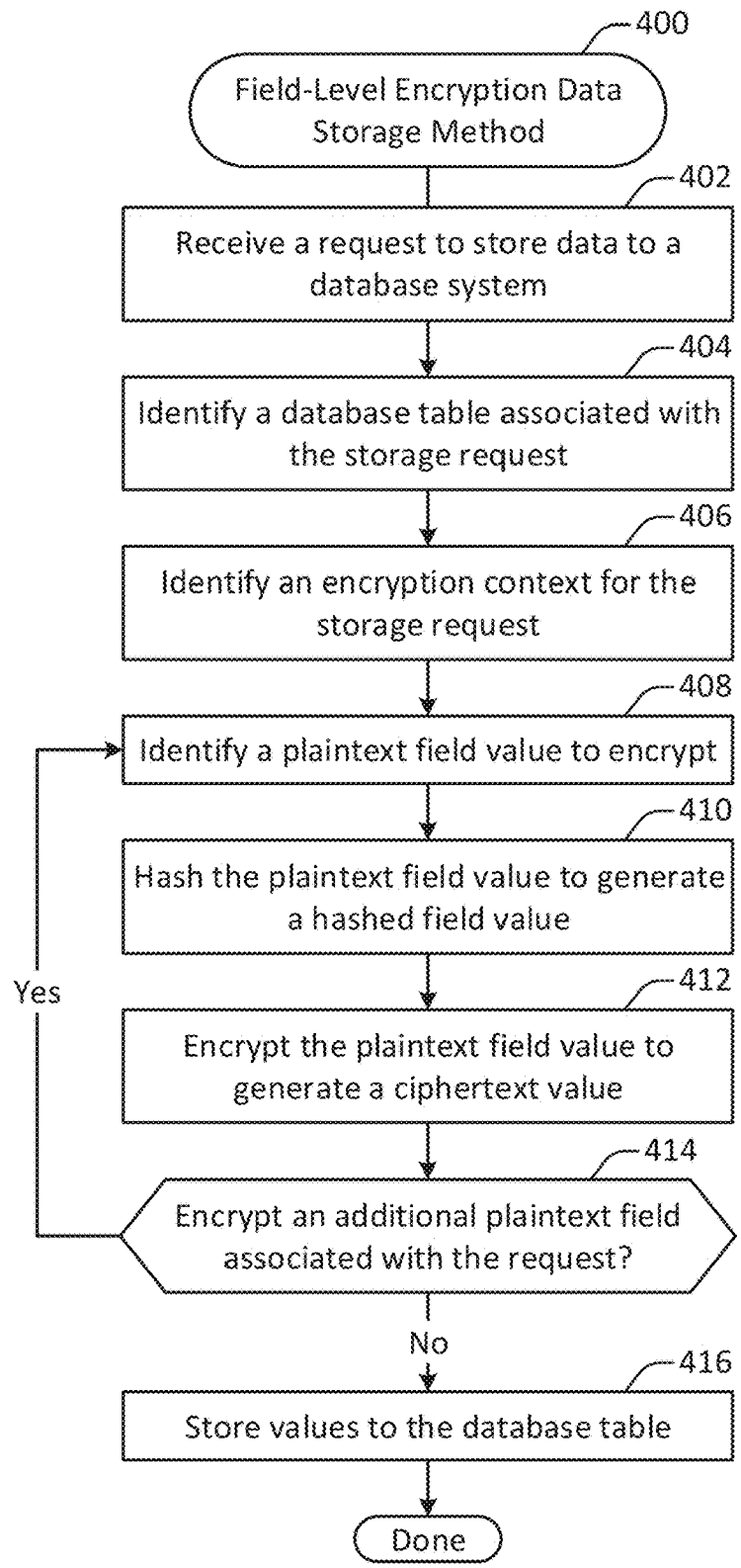
FIG. 4 illustrates an example of a method for storing data in a database system, performed in accordance with one or more embodiments.

FIG. 4 illustrates an example of a method 400 for storing data in a database system, performed in accordance with one or more embodiments. According to various embodiments, the method 400 may be performed as part of a data ingestion process. The data ingestion process may be as small as updating a single value in a particular database entry (i.e., row) or as large as ingesting all of the values in a newly created database table.

A request to store data to a database system is received at 402. According to various embodiments, the request may include one or more values to store in the database system. In some instances, new data values may be added, for instance when adding new rows. Alternatively, or additionally, existing data values may be updated.

According to various embodiments, the request may include one or more contextual elements in addition to the values to store. Such contextual elements may provide the database system with information facilitating the storage of the database elements. Such contextual elements may include, but are not limited to: a database table in which to store the values, an organization or other entity associated with the storage request, authorization or information demonstrating that the requestor is authorized to update the database system as specified by the request, and/or any other relevant information.

A database table associated with the storage request is identified at 404. According to various embodiments, the database table may be identified based on information included with the request, as discussed with respect to the operation 402.

An encryption context for the storage request is identified at 406. According to various embodiments, the encryption context may be identified by first identifying a data context and then identifying the encryption context from the data context, as discussed with respect to FIG. 3. The encryption context may include information such as which field or fields included in the request are to be encrypted, what type of encryption or hashing procedures are to be employed, how or where to determine a hash key and/or an encryption key.

A plaintext field value to encrypt is identified at 408. According to various embodiments, the encryption context identified at 406 may indicate which fields are to be stored in an encrypted state. Then, a value associated with a field so identified may be treated as a plaintext field value to be encrypted.

In some embodiments, the plaintext field value may be included with the request received at 402. Alternatively, a plaintext field value may be retrieved from a different location, such as a storage device. For instance, the request may indicate that a file containing data field values is to be ingested into the database system.

The plaintext value is hashed at 410 using a keyed-hash function to generate a keyed-hashed field value. According to various embodiments, the keyed-hash function may be any suitable non-reversible cryptographic hash function that takes as an input both a plaintext value and a cryptographic key. For example, the keyed-hashed field value may be a keyed-hash message authentication code (HMAC) value that results from applying a cryptographic hash function to the plaintext value in conjunction with a cryptographic hash key.

According to various embodiments, one or more of a variety of techniques may be used to generate the keyed-hash field value. Such techniques may include, but are not limited to: SHA-1, SHA-2, SHA-3, SHA256, MD5, and RIPEMD-128.

In some implementations, the cryptographic hash key may be identified based on the encryption context identified at operation 406. For instance, the encryption context may specify a cryptographic hash key identifier or a way in which to generate a cryptographic hash key.

According to various embodiments, cryptographic hash key may be specific to a particular scope within the database system. For example, a cryptographic hash key may be specific to a database table. As another example, in the case of a multitenant database, a cryptographic hash key may be specific to an entity or organization storing data in the database table. As another example, in the case of a dynamic schema database, a cryptographic hash key may be specific to a particular data object definition for an object type stored in the database table. As still another example, in the case of a database table that is both dynamic schema and multitenant, a cryptographic hash key may be specific to the combination of an entity and a data object definition. Other variations are possible, including combinations of the examples described above.

The plaintext field value is encrypted at 412 to generate a ciphertext value. According to various embodiments, the plaintext field value may be encrypted with a cryptographic encryption key that is identified based on the encryption context identified at operation 406. In addition to the encryption key, an initialization vector may be employed. As discussed with respect to FIG. 3, the initialization vector may be used to ensure that the same plaintext in different rows yields different ciphertext values even when hashed with the same cryptographic hash key. The initialization vector may be generated dynamically at runtime, for instance via a random or pseudo-random process.

According to various embodiments, one or more of a variety of techniques may be used to generate the ciphertext from the plaintext using the identified cryptographic encryption key. Such techniques may include, but are not limited to: Advanced Encryption Standard (AES), Data Encryption Standard (DES), International Data Encryption Algorithm (IDEA), Blowfish, Rivest Cipher 5 (RC5), Rivest Cipher 6 (RC6), other encryption algorithms, or combinations thereof.

In particular embodiments, different database entries may be encrypted via different encryption algorithms. For instance, some algorithms may be more computationally intensive and thus may be limited to particular entities, data entries, database tables, or other contexts. The particular encryption approach to use may be specified in the encryption context identified at 406.

A determination is made at 414 as to whether to encrypt an additional plaintext field associated with the request. According to various embodiments, plaintext fields may be encrypted in sequence or in parallel until all plaintext field values included with the request received at 402 and identified as being targeted for encryption by the encryption context identified at 406 have indeed been encrypted.

Values are stored to the database table at 416. According to various embodiments, the values stored to the database table may include, but are not limited to, the values described with respect to FIG. 3. That is, each of the ciphertext value, the keyed-hash field value, the initialization vector, and identifiers associated with the encryption and hash keys may be stored. In addition, one or more other values may be stored.

In some embodiments, if a row includes more than one plaintext value to be encrypted, different plaintext values may be encrypted with different cryptographic encryption keys and/or different cryptographic hash keys. Alternatively, a cryptographic encryption key and/or cryptographic hash key may be used for more than one encrypted field in a database row.

Figure 5:
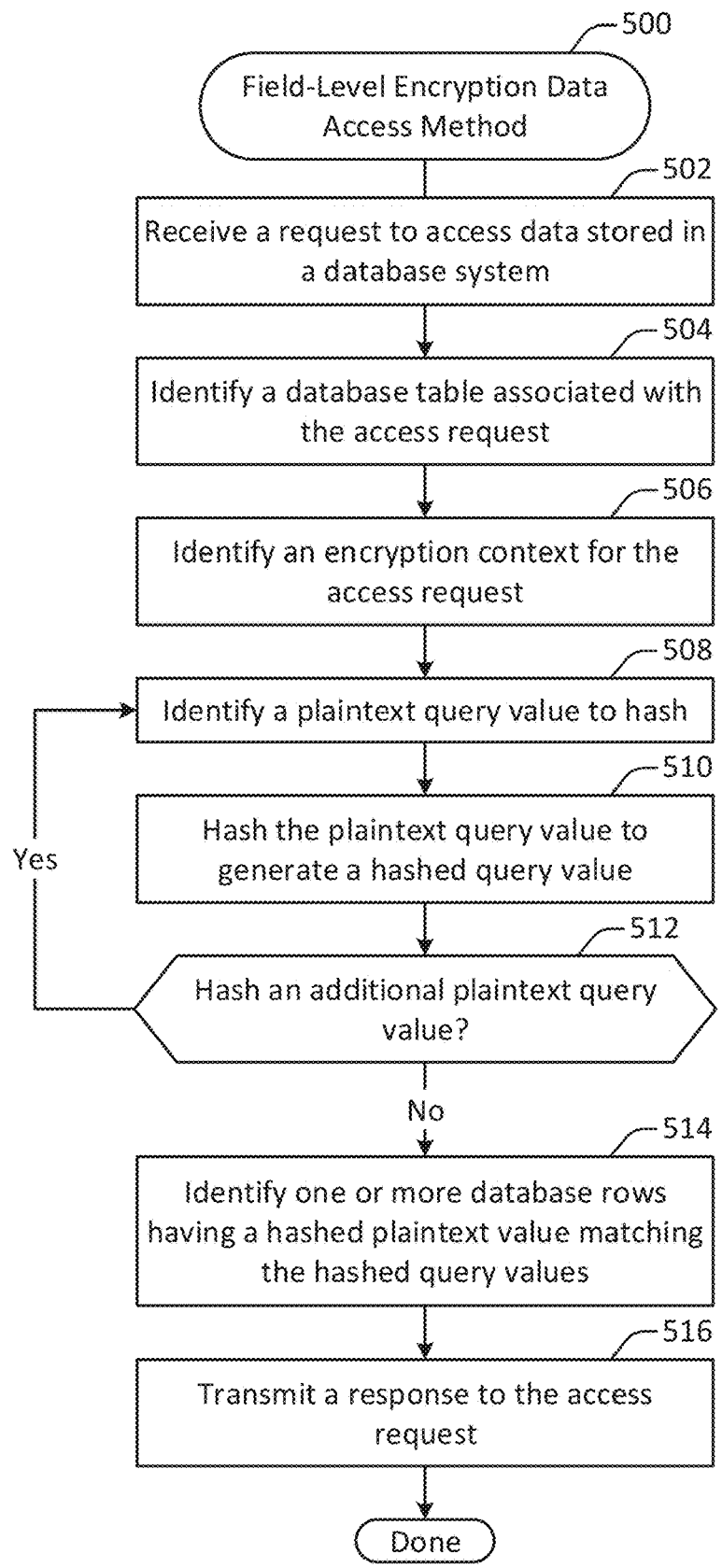
FIG. 5 illustrates an example of a method for retrieving data from a database system, performed in accordance with one or more embodiments.

FIG. 5 illustrates an example of a method 500 for retrieving data from a database system, performed in accordance with one or more embodiments. According to various embodiments, the method 500 may be performed. According to various embodiments, the method 400 may be performed as part of a data access process. The data access process may be as small as retrieving a single value in a particular database entry (i.e., row) or as large as retrieving all of the values in multiple database rows.

A request to access data stored in a database system is received at 502. According to various embodiments, the request may include one or more query values. For example, the request may seek to retrieve one or more values from records that have field values that match the one or more query values.

According to various embodiments, various types of search parameters may be used. For instance, the search parameters may identify a single query string to use for searching a single database field. However, the search parameters may also identify multiple query strings for searching a single database field. Alternatively, or additionally, the search parameters may identify multiple database fields to search.

According to various embodiments, the request may include one or more contextual elements in addition to the values to store. Such contextual elements may provide the database system with information facilitating access to the database elements. Such contextual elements may include, but are not limited to: a database table in which to store the values, an organization or other entity associated with the data access request, authorization or information demonstrating that the requestor is authorized to access the database system as specified by the request, and/or any other relevant information.

A database table associated with the access request is identified at 504. According to various embodiments, the database table may be identified based on information included with the request, as discussed with respect to the operation 502.

An encryption context for the storage request is identified at 506. According to various embodiments, the encryption context may be identified by first identifying a data context and then identifying the encryption context from the data context, as discussed with respect to FIG. 3. The encryption context may include information such as which field or fields included in the database table are encrypted, what type of encryption or keyed hashing procedures are to be employed, how or where to determine a hash key and/or an encryption key for those fields A plaintext query value to hash is identified at 508. According to various embodiments, the encryption context identified at 506 may indicate which fields are to be stored in an encrypted state. Then, a query value associated with a field so identified may be treated as a plaintext field value to be hashed for searching.

In some embodiments, the plaintext query value may be included with the request received at 502. Alternatively, a plaintext query value may be retrieved from a different location, such as a storage device. For instance, the request may indicate that a file containing data query values is to be ingested into the database system.

The plaintext query value is hashed at 510 to generate a hashed query value. According to various embodiments, the hashed query value may be a keyed-hash message authentication code (HMAC) value that results from applying a cryptographic hash function to the plaintext query value in conjunction with a cryptographic hash key. In order to employ the keyed-hash value for searching purposes, the plaintext query value needs to be hashed with the same keyed hashing procedure and cryptographic hash key as was used to hash the field values stored in the database table that are being searched.

In particular embodiments, a plaintext query value may be hashed using more than one cryptographic hash key to generate more than one keyed-hash value. For example, encryption keys, hash keys, and/or initialization vectors may periodically be updated. However, for a large database table, such an update operation may require a considerable amount of time, during which the database table may continue to be used to store and/or retrieve data. Accordingly, a plaintext query value may be hashed using one or more older hash keys and/or one or more newer hash keys, with each of the resulting keyed-hash values used to identify matching rows.

In some implementations, the cryptographic hash key may be identified based on the encryption context identified at operation 506. For instance, the encryption context may specify a cryptographic hash key identifier or a way in which to generate a cryptographic hash key. As discussed with respect to the operation 406 shown in FIG. 4, a cryptographic hash key may be specific to a particular scope within the database system.

A determination is made at 512 as to whether to search using an additional plaintext query value associated with the request. According to various embodiments, plaintext query values may be encrypted in sequence or in parallel until all plaintext query values included with the request received at 502 and identified as being directed to encrypted database table fields have been hashed for querying.

One or more database rows having a keyed-hash value matching the keyed-hashed query value or values are identified at 514. In some implementations, the one or more database rows may be identified at least in part by executing a database search query using the hashed query value or values instead of the plaintext values, and applying those search parameters to the fields identified as being encrypted.

According to various embodiments, queries of varying degrees of complexity may be executed. For instance, a simple query may seek to access a single data value based on a single hashed query value applied to a single hashed and encrypted database field. However, a more complex query may combine one or more query parameters for one or more encrypted fields with one or more query parameters for one or more unencrypted fields. Various combinations are possible.

A response to the access request is transmitted at 516. According to various embodiments, the response that is transmitted may depend on the nature of the database access request and the results returned by executing the access request. For example, in some instances the response may return one or more values from rows that were identified at 514 in response to executing the request. As another example, in some instances the response may return an indication that the request has succeeded or failed in identifying one or more database rows.

Figure 9:
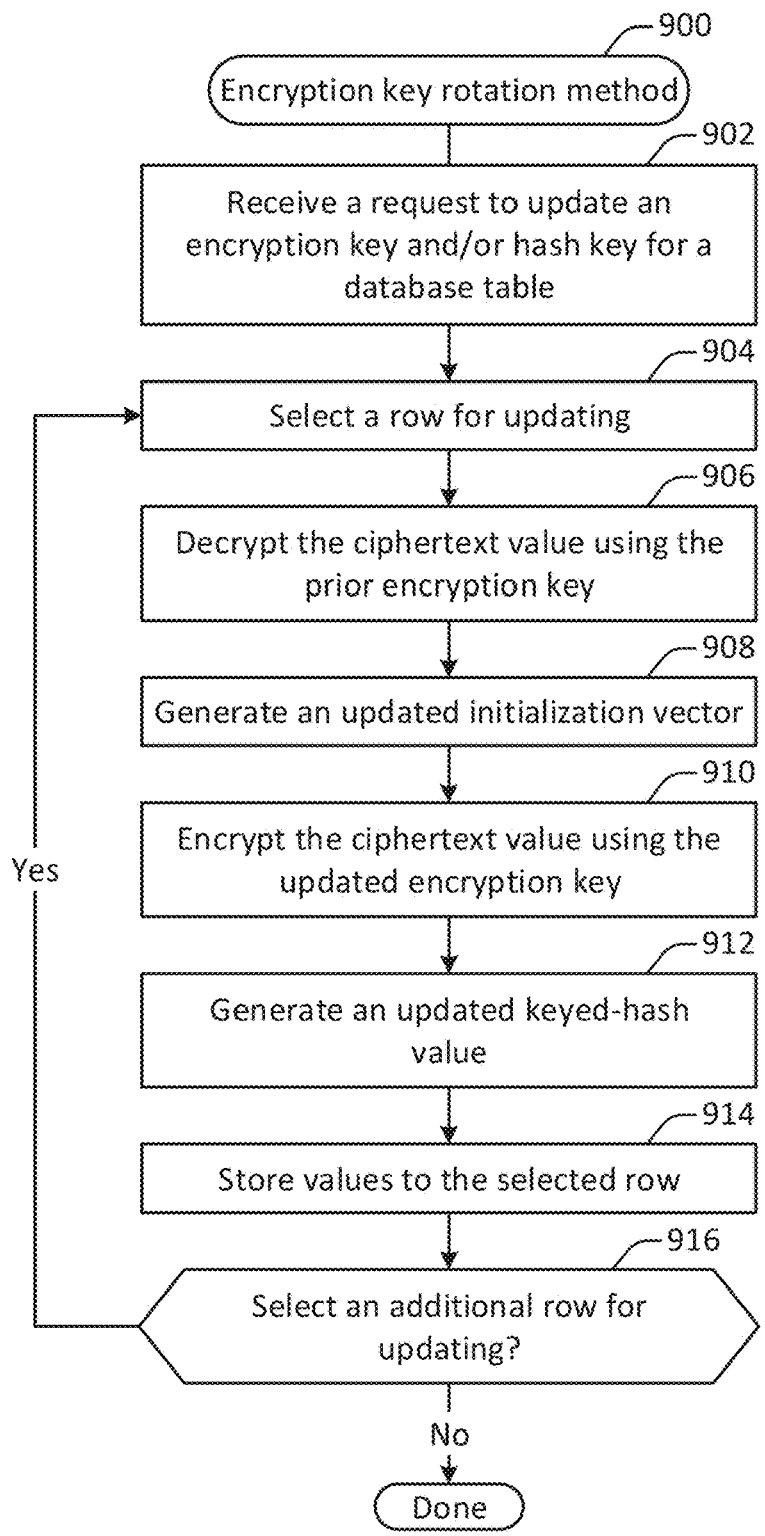
FIG. 9 illustrates an example of a method for rotating an encryption key, performed in accordance with one or more embodiments.

FIG. 9 illustrates an example of an encryption key rotation method 900, performed in accordance with one or more embodiments. According to various embodiments, the encryption key rotation method 900 may be performed within a database system.

A request to update an encryption key and/or hash key for a database table is received at 902. According to various embodiments, the request may be generated automatically, for instance on a periodic basis. Alternatively, the request may be generated based on user input, for instance when an organization storing data in the database system transmits such a request.

In particular embodiments, the request may identify a new encryption key to use, for instance for a database table in which data associated with a particular organization is stored. Alternatively, or additionally, the request may identify a new hash key. As yet another possibility, the request may indicate that the database system itself should generate a new encryption key and/or hash key.

A row for updating is selected at 904. According to various embodiments, rows may be selected for updating in sequence, at random, or in any suitable order. The ciphertext value is decrypted using the prior encryption key at 906. At 908 an updated initialization vector is generated. The decrypted ciphertext is then encrypted using the updated encryption key at 910. Then, at 912, an updated keyed-hash value using the updated cryptographic hash key is generated. The updated values are stored to the selected row at 914.

A determination is made at 916 as to whether to select an additional row for updating. According to various embodiments, additional rows for updating may continue to be selected until the request submitted at 902 is satisfied.

In particular embodiments, the method 900 may be executed without locking the database table. Accordingly, requests to store and/or retrieve data may continue to be served while the encryption keys are being rotated.

Figure 6:
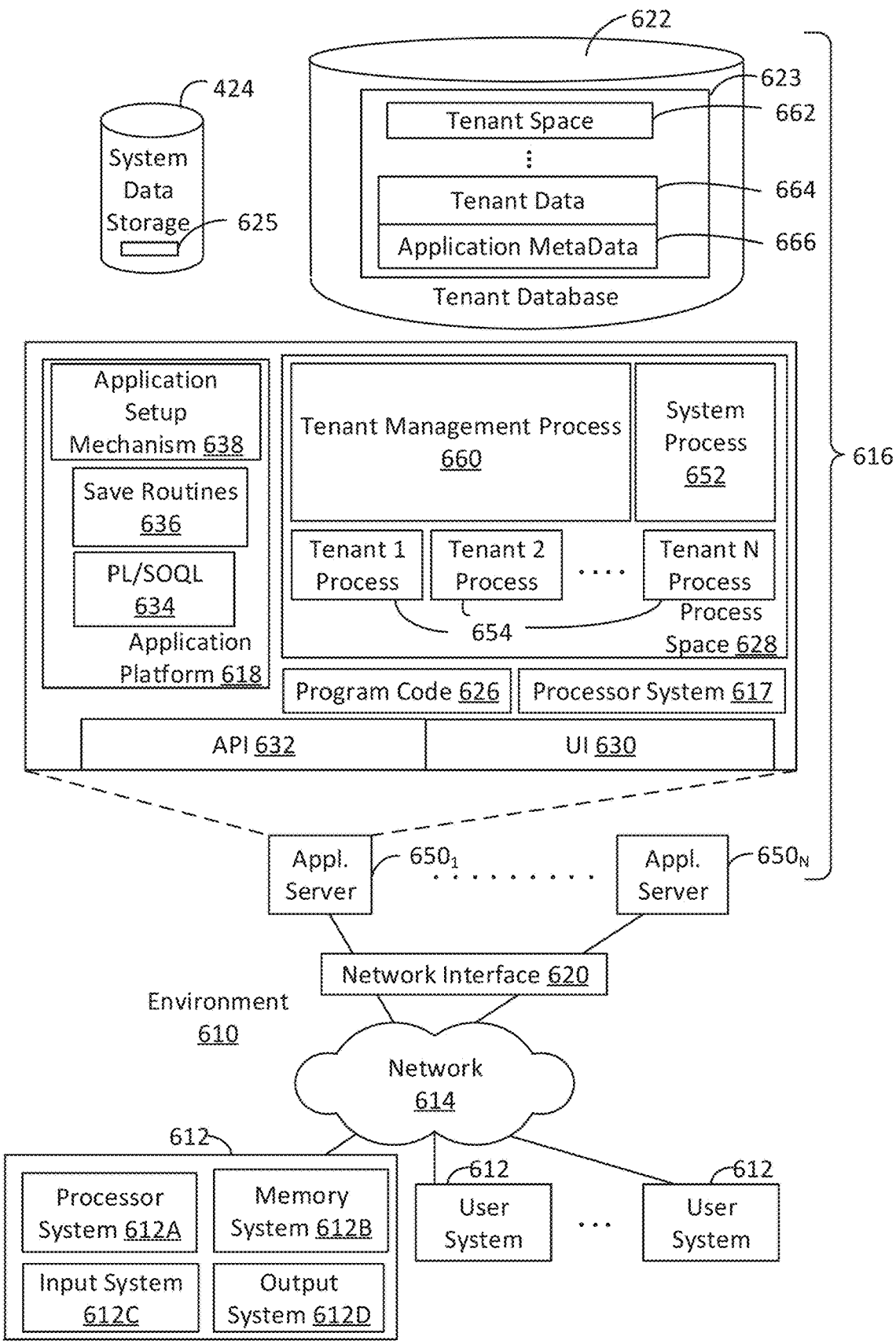
FIG. 6 shows a block diagram of an example of an environment that includes an on-demand database service configured in accordance with some implementations.

FIG. 6 shows a block diagram of an example of an environment 610 that includes an on-demand database service configured in accordance with some implementations. Environment 610 may include user systems 612, network 614, database system 616, processor system 617, application platform 618, network interface 620, tenant data storage 622, tenant data 623, system data storage 624, system data 625, program code 626, process space 628, User Interface (UI) 630, Application Program Interface (API) 632, PL/SOQL 634, save routines 636, application setup mechanism 638, application servers 650-1 through 650-N, system process space 652, tenant process spaces 654, tenant management process space 660, tenant storage space 662, user storage 664, and application metadata 666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 618 may be a framework that allows the creation, management, and execution of applications in system 616. Such applications may be developed by the database service provider or by users or third-party application developers accessing the service. Application platform 618 includes an application setup mechanism 638 that supports application developers' creation and management of applications, which may be saved as metadata into tenant data storage 622 by save routines 636 for execution by subscribers as one or more tenant process spaces 654 managed by tenant management process 660 for example. Invocations to such applications may be coded using PL/SOQL 634 that provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 666 for a subscriber making such an invocation. Such system processes may also manage execution of application metadata 666 as an application in a virtual machine.

In some implementations, each application server 650 may handle requests for any user associated with any organization. A load balancing function (e.g., an F5 Big-IP load balancer) may distribute requests to the application servers 650 based on an algorithm such as least-connections, round robin, observed response time, etc. Each application server 650 may be configured to communicate with tenant data storage 622 and the tenant data 623 therein, and system data storage 624 and the system data 625 therein to serve requests of user systems 612. The tenant data 623 may be divided into individual tenant storage spaces 662, which can be either a physical arrangement and/or a logical arrangement of data. Within each tenant storage space 662, user storage 664 and application metadata 666 may be similarly allocated for each user. For example, a copy of a user's most recently used (MRU) items might be stored to user storage 664. Similarly, a copy of MRU items for an entire tenant organization may be stored to tenant storage space 662. A UI 630 provides a user interface and an API 632 provides an application programming interface to system 616 resident processes to users and/or developers at user systems 612.

System 616 may implement a web-based database system. For example, in some implementations, system 616 may include application servers configured to implement and execute database access software applications. The application servers may be configured to provide related data, code, forms, web pages and other information to and from user systems 612. Additionally, the application servers may be configured to store information to, and retrieve information from a database system. Such information may include related data, objects, and/or Webpage content. With a multi-tenant system, data for multiple tenants may be stored in the same physical database object in tenant data storage 622, however, tenant data may be arranged in the storage medium(s) of tenant data storage 622 so that data of one tenant is kept logically separate from that of other tenants. In such a scheme, one tenant may not access another tenant's data, unless such data is expressly shared.

Several elements in the system shown in FIG. 6 include conventional, well-known elements that are explained only briefly here. For example, user system 612 may include processor system 612A, memory system 612B, input system 612C, and output system 612D. A user system 612 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 612 to access, process and view information, pages and applications available from system 616 over network 614. Network 614 may be any network or combination of networks of devices that communicate with one another, such as any one or any combination of a LAN (local area network), WAN (wide area network), wireless network, or other appropriate configuration.

The users of user systems 612 may differ in their respective capacities, and the capacity of a particular user system 612 to access information may be determined at least in part by "permissions" of the particular user system 612. As discussed herein, permissions generally govern access to computing resources such as data objects, components, and other entities of a computing system, such as a general purpose database system, a social networking system, and/or a CRM database system. "Permission sets" generally refer to groups of permissions that may be assigned to users of such a computing environment. For instance, the assignments of users and permission sets may be stored in one or more databases of System 616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 616 may provide on-demand database service to user systems 612 using an MTS arrangement. By way of example, one tenant organization may be a company that employs a sales force where each salesperson uses system 616 to manage their sales process. Thus, a user in such an organization may maintain contact data, leads data, customer follow-up data, performance data, goals and progress data, etc., all applicable to that user's personal sales process (e.g., in tenant data storage 622). In this arrangement, a user may manage his or her sales efforts and cycles from a variety of devices, since relevant data and applications to interact with (e.g., access, view, modify, report, transmit, calculate, etc.) such data may be maintained and accessed by any user system 612 having network access.

When implemented in an MTS arrangement, system 616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 616 may also maintain system-level data usable by multiple tenants or other data. Such system-level data may include industry reports, news, postings, and the like that are sharable between tenant organizations.

In some implementations, user systems 612 may be client systems communicating with application servers 650 to request and update system-level and tenant-level data from system 616. By way of example, user systems 612 may send one or more queries requesting data of a database maintained in tenant data storage 622 and/or system data storage 624. An application server 650 of system 616 may automatically generate one or more SQL statements (e.g., one or more SQL queries) that are designed to access the requested data. System data storage 624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. In some systems, database fields may be stored in an encrypted and searchable state. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 7A:
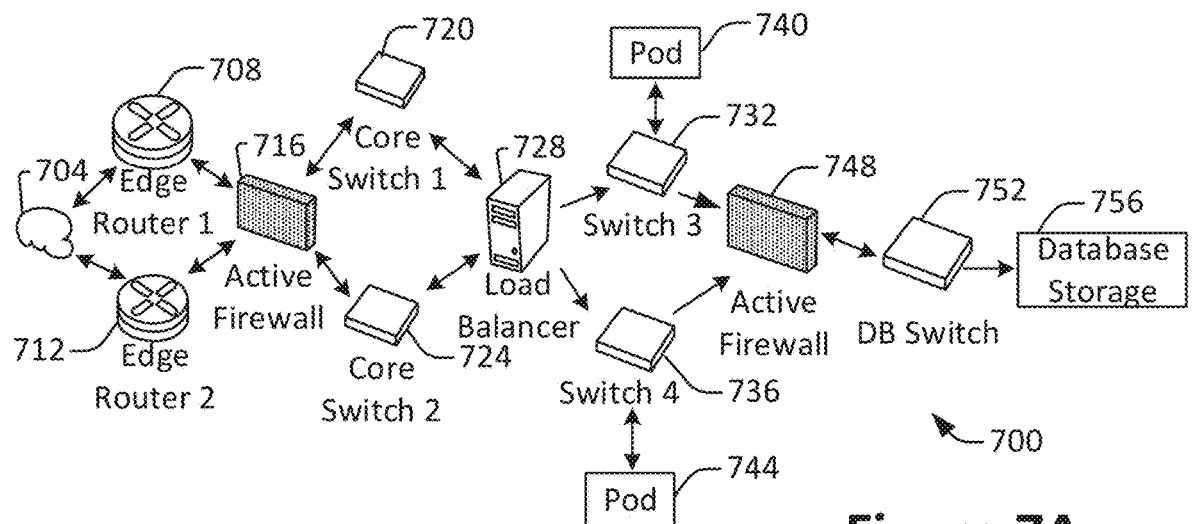
FIG. 7A shows a system diagram of an example of architectural components of an on-demand database service environment, configured in accordance with some implementations.

FIG. 7A shows a system diagram of an example of architectural components of an on-demand database service environment 700, configured in accordance with some implementations. A client machine located in the cloud 704 may communicate with the on-demand database service environment via one or more edge routers 708 and 712. A client machine may include any of the examples of user systems 612 described above. The edge routers 708 and 712 may communicate with one or more core switches 720 and 724 via firewall 716. The core switches may communicate with a load balancer 728, which may distribute server load over different pods, such as the pods 740 and 744 by communication via pod switches 732 and 736. The pods 740 and 744, which may each include one or more servers and/or other computing resources, may perform data processing and other operations used to provide on-demand services. Components of the environment may communicate with a database storage 756 via a database firewall 748 and a database switch 752.

Accessing an on-demand database service environment may involve communications transmitted among a variety of different components. The environment 700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 7A and 7B.

The cloud 704 refers to any suitable data network or combination of data networks, which may include the Internet. Client machines located in the cloud 704 may communicate with the on-demand database service environment 700 to access services provided by the on-demand database service environment 700. By way of example, client machines may access the on-demand database service environment 700 to retrieve, store, edit, and/or process database field searching and/or encryption information.

In some implementations, the edge routers 708 and 712 route packets between the cloud 704 and other components of the on-demand database service environment 700. The edge routers 708 and 712 may employ the Border Gateway Protocol (BGP). The edge routers 708 and 712 may maintain a table of IP networks or 'prefixes', which designate network reachability among autonomous systems on the internet.

In one or more implementations, the firewall 716 may protect the inner components of the environment 700 from internet traffic. The firewall 716 may block, permit, or deny access to the inner components of the on-demand database service environment 700 based upon a set of rules and/or other criteria. The firewall 716 may act as one or more of a packet filter, an application gateway, a stateful filter, a proxy server, or any other type of firewall.

In some implementations, the core switches 720 and 724 may be high-capacity switches that transfer packets within the environment 700. The core switches 720 and 724 may be configured as network bridges that quickly route data between different components within the on-demand database service environment. The use of two or more core switches 720 and 724 may provide redundancy and/or reduced latency.

In some implementations, communication between the pods 740 and 744 may be conducted via the pod switches 732 and 736. The pod switches 732 and 736 may facilitate communication between the pods 740 and 744 and client machines, for example via core switches 720 and 724. Also or alternatively, the pod switches 732 and 736 may facilitate communication between the pods 740 and 744 and the database storage 756. The load balancer 728 may distribute workload between the pods, which may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748, which may act as a computer application firewall operating at the database application layer of a protocol stack. The database firewall 748 may protect the database storage 756 from application attacks such as structure query language (SQL) injection, database rootkits, and unauthorized information disclosure. The database firewall 748 may include a host using one or more forms of reverse proxy services to proxy traffic before passing it to a gateway router and/or may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, the database storage 756 may be an on-demand database system shared by many different organizations. The on-demand database service may employ a single-tenant approach, a multi-tenant approach, a virtualized approach, or any other type of database approach. Communication with the database storage 756 may be conducted via the database switch 752. The database storage 756 may include various software components for handling database queries. Accordingly, the database switch 752 may direct database queries transmitted by other components of the environment (e.g., the pods 740 and 744) to the correct components within the database storage 756.

Figure 7B:
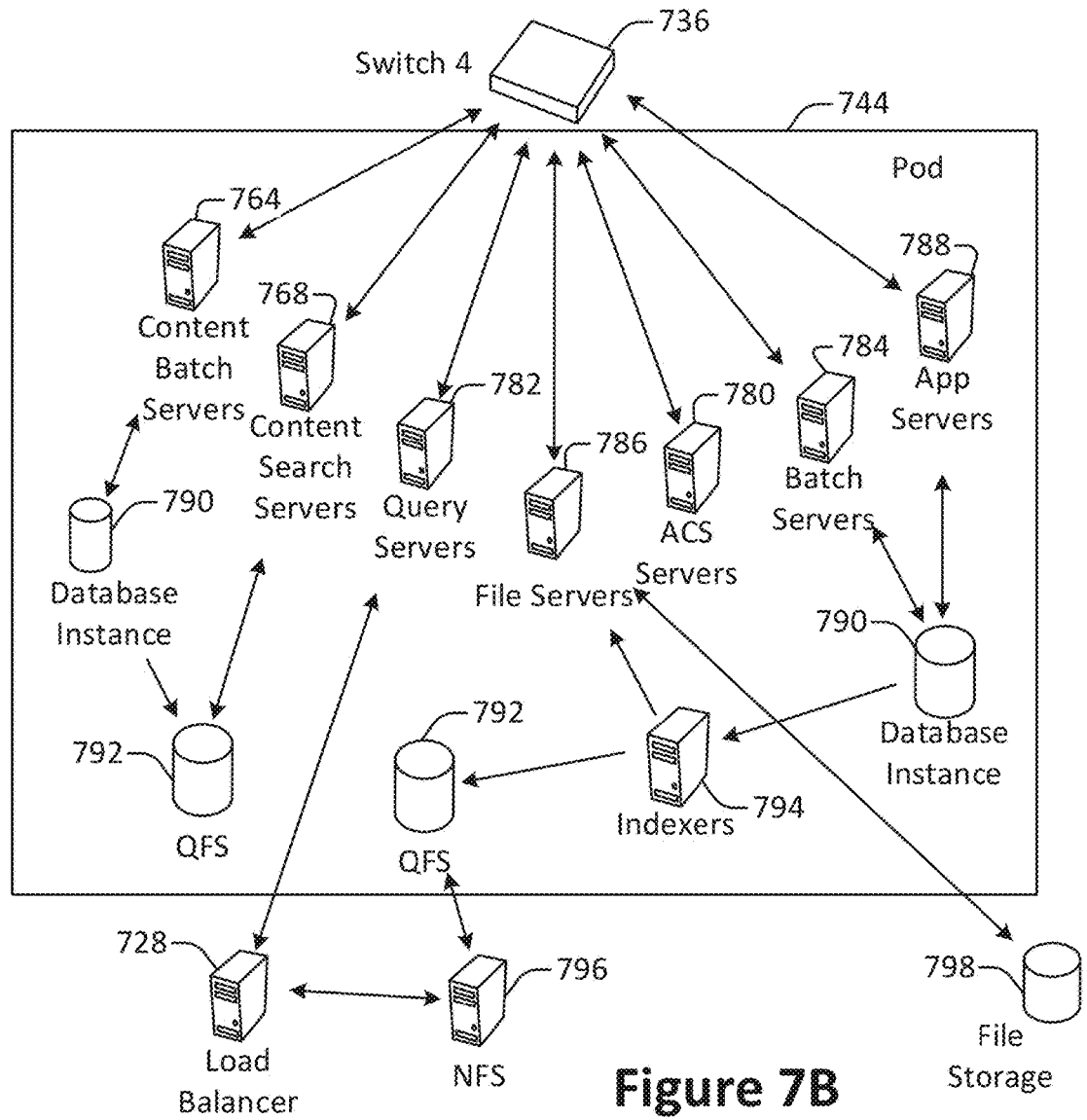
FIG. 7B shows a system diagram further illustrating an example of architectural components of an on-demand database service environment, in accordance with some implementations.

FIG. 7B shows a system diagram further illustrating an example of architectural components of an on-demand database service environment, in accordance with some implementations. The pod 744 may be used to render services to user(s) of the on-demand database service environment 700. The pod 744 may include one or more content batch servers 764, content search servers 768, query servers 782, file servers 786, access control system (ACS) servers 780, batch servers 784, and app servers 788. Also, the pod 744 may include database instances 790, quick file systems (QFS) 792, and indexers 794. Some or all communication between the servers in the pod 744 may be transmitted via the switch 736.

In some implementations, the app servers 788 may include a framework dedicated to the execution of procedures (e.g., programs, routines, scripts) for supporting the construction of applications provided by the on-demand database service environment 700 via the pod 744. One or more instances of the app server 788 may be configured to execute all or a portion of the operations of the services described herein.

In some implementations, as discussed above, the pod 744 may include one or more database instances 790. A database instance 790 may be configured as an MTS in which different organizations share access to the same database, using the techniques described above. Database information may be transmitted to the indexer 794, which may provide an index of information available in the database 790 to file servers 786. The QFS 792 or other suitable filesystem may serve as a rapid-access file system for storing and accessing information available within the pod 744. The QFS 792 may support volume management capabilities, allowing many disks to be grouped together into a file system. The QFS 792 may communicate with the database instances 790, content search servers 768 and/or indexers 794 to identify, retrieve, move, and/or update data stored in the network file systems (NFS) 796 and/or other storage systems.

In some implementations, one or more query servers 782 may communicate with the NFS 796 to retrieve and/or update information stored outside of the pod 744. The NFS 796 may allow servers located in the pod 744 to access information over a network in a manner similar to how local storage is accessed. Queries from the query servers 722 may be transmitted to the NFS 796 via the load balancer 728, which may distribute resource requests over various resources available in the on-demand database service environment 700. The NFS 796 may also communicate with the QFS 792 to update the information stored on the NFS 796 and/or to provide information to the QFS 792 for use by servers located within the pod 744.

In some implementations, the content batch servers 764 may handle requests internal to the pod 744. These requests may be long-running and/or not tied to a particular customer, such as requests related to log mining, cleanup work, and maintenance tasks. The content search servers 768 may provide query and indexer functions such as functions allowing users to search through content stored in the on-demand database service environment 700. The file servers 786 may manage requests for information stored in the file storage 798, which may store information such as documents, images, basic large objects (BLOBs), etc. The query servers 782 may be used to retrieve information from one or more file systems. For example, the query system 782 may receive requests for information from the app servers 788 and then transmit information queries to the NFS 796 located outside the pod 744. The ACS servers 780 may control access to data, hardware resources, or software resources called upon to render services provided by the pod 744. The batch servers 784 may process batch jobs, which are used to run tasks at specified times. Thus, the batch servers 784 may transmit instructions to other servers, such as the app servers 788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 8:
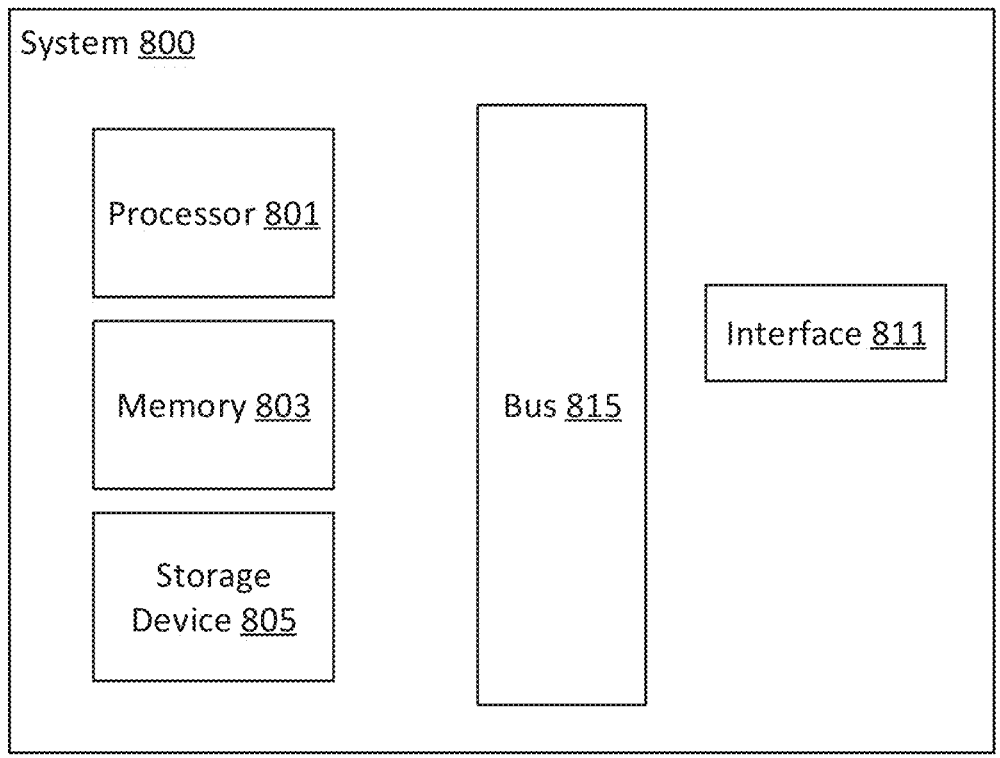
FIG. 8 illustrates one example of a computing device, configured in accordance with one or more embodiments.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a database server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. The interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:

receiving via a communication interface a request to search a database field in a database table for a query value, the database table storing a plurality of rows including a corresponding plurality of keyed-hash values generated at the database system based on a plurality of cryptographic hash keys, and a plurality of cryptographic hash key identifiers identifying the plurality of cryptographic hash keys, wherein a first row in the database table includes a first initialization vector, and wherein a second row in the database table includes a second initialization vector different from the first initialization vector, and wherein the first row includes a first encrypted field value encrypted based on the first initialization vector and wherein the second row includes a second encrypted field value encrypted based on the second initialization vector;

identifying a designated encryption context based on the request, the designated encryption context indicating a designated cryptographic hash key of the plurality of cryptographic hash keys and a corresponding cryptographic hash key identifier of the plurality of cryptographic hash key identifiers based on the request, the designated encryption context being one of a plurality of encryption contexts associated with the database table, wherein the database table is a multitenant database table storing data owned by a plurality of entities, and wherein the designated encryption context is specific to a designated one of the plurality of entities;

hashing the query value via a processor with a designated keyed-hash function and the designated cryptographic hash key to produce a designated keyed-hash value;

identifying a row in the database table based on the encryption context and the designated keyed-hash value, the identified row including a keyed-hash field value that matches the designated keyed-hash value, the identified row further including a cryptographic hash key identifier that identifies the designated cryptographic hash key and that matches the corresponding cryptographic hash key identifier, the identified row including an encrypted field value generated by encrypting an unencrypted field value matching the query value; and transmitting via the communication interface one or more data values associated with the identified row in response to the request.

2. The method recited in claim 1, wherein the encrypted field is encrypted using a designated initialization vector stored in the identified row and an encryption key.

3. The method recited in claim 1, wherein the database table includes a first value encrypted using a first cryptographic encryption key stored in a hardware security module and a second value encrypted using a second cryptographic encryption key stored in a storage location outside the hardware security module.

4. The method recited in claim 1, wherein the identified row includes a cryptographic encryption key identifier that identifies an encryption key used to encrypt the encrypted field value.

5. The method recited in claim 1, wherein the identified row includes a cryptographic hash key identifier that identifies the designated cryptographic hash key.

6. The method recited in claim 1, wherein a first row in the database table includes a first encrypted field value encrypted via a first encryption algorithm, and wherein a second row in the database table includes a second encrypted field value encrypted via a second encryption algorithm, the first and second encryption algorithms being different.

7. The method recited in claim 1, wherein the database table is a dynamic schema database table that is associated with a plurality of data object definitions, a first row in the database table being associated with a first data object definition, a second row in the database table being associated with a second data object definition.

8. The method recited in claim 7, wherein the designated encryption context is specific to a designated one of the plurality of data object definitions.

9. A database system implemented on a computer system, the database system comprising:
a communication interface operable to receive a request to search a database field in a database table for a query value, the database table storing a plurality of rows including a corresponding plurality of keyed-hash values generated at the database system based on a plurality of cryptographic hash keys, and a plurality of cryptographic hash key identifiers identifying the plurality of cryptographic hash keys, wherein a first row in the database table includes a first initialization vector, and wherein a second row in the database table includes a second initialization vector different from the first initialization vector, and wherein the first row includes a first encrypted field value encrypted based on the first initialization vector and wherein the second row includes a second encrypted field value encrypted based on the second initialization vector;
a processor operable to a designated encryption context based on the request, the designated encryption context indicating a designated cryptographic hash key of the plurality of cryptographic hash keys and a corresponding cryptographic hash key identifier of the plurality of cryptographic hash key identifiers based on the request, the designated encryption context being one of a plurality of encryption contexts associated with the database table, wherein the database table is a multitenant database table storing data owned by a plurality of entities, and wherein the designated encryption context is specific to a designated one of the plurality of entities; and
a query engine operable to identify a row in the database table based on the encryption context and the designated keyed-hash value, the identified row including a keyed-hash field value that matches the designated keyed-hash value, the identified row further including a cryptographic hash key identifier that identifies the designated cryptographic hash key and that matches the corresponding cryptographic hash key identifier, the identified row including an encrypted field value generated by encrypting an unencrypted field value matching the query value.

10. The database system recited in claim 9, wherein the encrypted field is encrypted using a designated initialization vector stored in the identified row and an encryption key.

11. The database system recited in claim 9, wherein the database table is a dynamic schema database table that is associated with a plurality of data object definitions, a first row in the database table being associated with a first data object definition, a second row in the database table being associated with a second data object definition.

12. One or more non-transitory computer readable media having instructions stored thereon for performing a method, the method comprising:
receiving via a communication interface a request to search a database field in a database table for a query value, the database table storing a plurality of rows including a corresponding plurality of keyed-hash values generated at the database system based on a plurality of cryptographic hash keys, and a plurality of cryptographic hash key identifiers identifying the plurality of cryptographic hash keys, wherein a first row in the database table includes a first initialization vector, and wherein a second row in the database table includes a second initialization vector different from the first initialization vector, and wherein the first row includes a first encrypted field value encrypted based on the first initialization vector and wherein the second row includes a second encrypted field value encrypted based on the second initialization vector;
identifying a designated encryption context based on the request, the designated encryption context indicating a designated cryptographic hash key of the plurality of cryptographic hash keys and a corresponding cryptographic hash key identifier of the plurality of cryptographic hash key identifiers based on the request, the designated encryption context being one of a plurality of encryption contexts associated with the database table, wherein the database table is a multitenant database table storing data owned by a plurality of entities, and wherein the designated encryption context is specific to a designated one of the plurality of entities;
hashing the query value via a processor with a designated keyed-hash function and the designated cryptographic hash key to produce a designated keyed-hash value;
identifying a row in the database table based on the encryption context and the designated keyed-hash value, the identified row including a keyed-hash field value that matches the designated keyed-hash value, the identified row further including a cryptographic hash key identifier that identifies the designated cryptographic hash key and that matches the corresponding cryptographic hash key identifier, the identified row including an encrypted field value generated by encrypting an unencrypted field value matching the query value; and
transmitting via the communication interface one or more data values associated with the identified row in response to the request.

* * * * *